May 16, 1967 A. H. REEVES 3,320,605

CODING EQUIPMENT FOR PULSE CODE MODULATION SYSTEMS

Filed May 12, 1964 5 Sheets-Sheet 1

Inventor
ALEC HARLEY REEVES
By Philip M. Bolton
Attorney

May 16, 1967 A. H. REEVES 3,320,605

CODING EQUIPMENT FOR PULSE CODE MODULATION SYSTEMS

Filed May 12, 1964 5 Sheets-Sheet 2

Inventor
ALEC HARLEY REEVES
By Philip M. Bolton
Attorney

May 16, 1967 A. H. REEVES 3,320,605

CODING EQUIPMENT FOR PULSE CODE MODULATION SYSTEMS

Filed May 12, 1964

5 Sheets-Sheet 3

Inventor
ALEC HARLEY REEVES
By Philip M. Bolton
Attorney

May 16, 1967 A. H. REEVES 3,320,605

CODING EQUIPMENT FOR PULSE CODE MODULATION SYSTEMS

Filed May 12, 1964 5 Sheets-Sheet 4

Inventor
ALEC HARLEY REEVES
By Philips-Bolton
Attorney

May 16, 1967 A. H. REEVES 3,320,605

CODING EQUIPMENT FOR PULSE CODE MODULATION SYSTEMS

Filed May 12, 1964 5 Sheets-Sheet 5

Inventor
ALEC HARLEY REEVES
By Philip M. Bolton
Attorney

United States Patent Office 3,320,605

Patented May 16, 1967

3,320,605

CODING EQUIPMENT FOR PULSE CODE MODULATION SYSTEMS

Alec Harley Reeves, London, England, assignor to International Standard Electric Corporation, New York, N.Y., a corporation of Delaware Filed May 12, 1964, Ser. No. 366,778
Claims priority, application Great Britain, May 24, 1963, 20,842/63
18 Claims. (Cl. 340—347)

This invention relates to analogue-to-digital information converters, such as coding equipments used in pulse code modulations systems of communication (hereinafter referred to as P.C.M. systems).

In P.C.M. systems an analogue input signal is quantized into one of $k$ levels each of which is represented by a code combination in an $n$-digit code. The code combination is then transmitted over the communication channel and decoded in the receiver to recreate the analogue signal. Where the analogue input is a varying waveform such as a speech waveform, then it is sampled at frequent intervals, and the instantaneous value of the input at the moment of sampling is coded. Also, if a sufficiently high rate of sampling and coding is achieved, multiplexing of two or more sets of signals on a single communication channel becomes possible.

The term "multistable device" as used hereinafter means a device having two or more stable conditions.

According to the invention there is provided an analogue-to-digital converter, which comprises a system of inter-coupled multi-stable devices each of which is imparted a different switching characteristic, and to which an analogue quantity to be converted to its digital equivalent can be applied, the application of said analogue quantity tending to set said multi-stable devices to any one of a number of conditions, and an input over which a damped oscillatory condition may be applied to said multi-stable devices, the arrangement being such that when said oscillatory condition ends the conditions to which said multi-stable devices have been set as a result of an analogue condition applied thereto at the same time as said oscillatory condition represent a digital code combination corresponding to said analogue condition.

Embodiments of the invention will now be described with reference to the accompanying drawings, in which.

Figure 1:
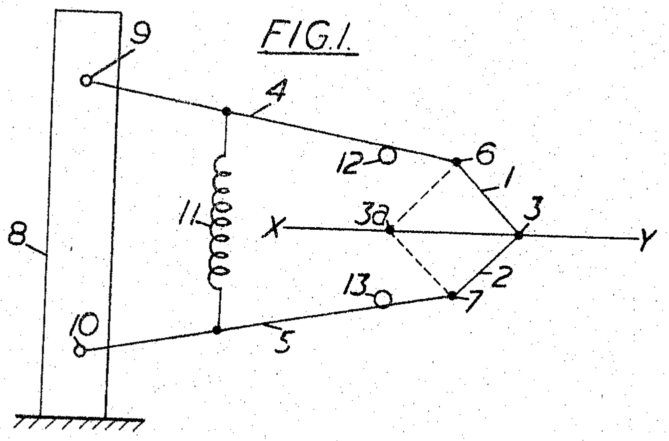
FIG. 1 illustrates a mechanical bistable device.

In the diagram of FIG. 1 the rods 1 and 2 are pivotally linked together at point 3, and to the rods 4 and 5 at points 6 and 7. Rods 4 and 5 are pivoted to the fixed support 8 at the points 9 and 10. A spring 11 is attached to the rods 4 and 5, and stops 12 and 13 restrict the movements of the rods 4 and 5 under the action of the spring 11. The complete arrangement forms a stable device, with the point 3 on the axis XY as shown. If now the point 3 is moved from right to left along the axis XY, the angle between the rods 1 and 2 increases, and the points 6 and 7 will move further apart. This movement increases the tension in the spring 11, until such time as the rods 1 and 2 are in a straight line with one another. Further movement of the point 3 to the left results in a drawing together again of the points 6 and 7, due to the toggle action of the rods 1 and 2, and to a consequent lessening of tension in the spring 11. This continues until further movement of the rods 4 and 5 is prevented by the stops 12 and 13. Thus the pair of rods 1 and 2 has two stable equilibrium positions, the position 3 (which may be called the "1" condition) and the position 3$a$ (which may be called the "0" condition). If a force is temporarily applied to the point 3, sufficient to move it more than half-way towards position 3$a$, then on removal of that force, and in the absence of any other external forces, the device will assume the "0" condition, under the influence of the spring 11. If however the force applied to point 3 is such that it moves less than halfway to position 3$a$, then on removal of the force the device will revert to the "1" condition. The same proposals hold true when movement from the "0" to the"1" condition is contemplated. Thus the arrangement of FIG. 1 can be considered as a two level binary coder, developing a single digit ("0" or "1") binary code output dependent on the magnitude of the force applied to the point 3.

Figure 2:
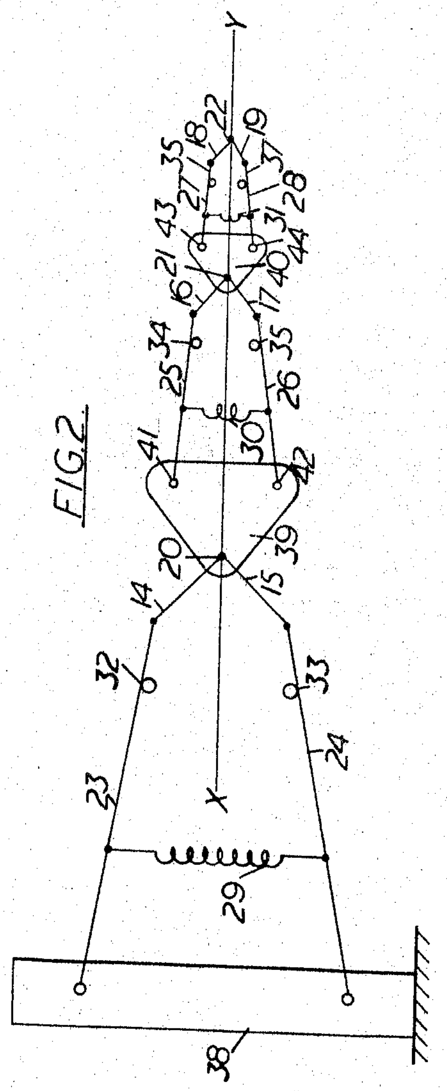
FIG. 2 illustrates a mechanical 3-digit coder.

Turning now to the arrangement of FIG. 2, this includes three, inter-connected, bistable devices of the kind described above, each of which consists of a pair of linked rods 14 and 15, 16 and 17, 18 and 19, with the pivot points 20, 21 and 22 corresponding to the point 3 of FIG. 1. Similarly the pairs of rods 23 and 24, 25 and 26, 27 and 28, the springs 29, 30 and 31, and the stops 32, 33 . . . 37 correspond to their counterparts in FIG. 1.

The fixed support 38 corresponds to the fixed support 8 in FIG. 1. The plate 39, though not fixed rigidly in relation to the whole system, acts as a fixed support for the rods 25 and 26, and fulfill the same function for them as does the fixed support 38 for the rods 23 and 24. The plate 39 is also attached to the pivot point 20, and therefore any movement of the point 20 along the axis XY results in a corresponding movement of the whole of the arrangement attached to the plate 39. Similarly the plate 40 is attached to the pivot point 21, with the same consequences as for plate 39.

The plates 39 and 40, and the points 20, 21 and 22 are all arranged to travel on the axis XY only, and each pair of pivot points 41, 42 and 43, 44 is on a line which is at 90° to the axis XY. In theory all the movements of the linkages and plates should be free from static friction though fluid damping is required. In a mechanical model the plates 39 and 40 are provided with stubs running in a groove (not shown) along the axis XY. Finally, the stops 34, 35 and 36, 37, are fixed in relation to their respective plates 39 and 40, as are the stops 32, 33 and the fixed support 38.

The complete arrangement of FIG. 2 comprises three interconnected bistable devices. The point 22 thus has eight stable positions, described as 000, 001, 010, 011, 100, 101, 110 and 111, where the first digit of each group of three corresponds to the stable condition of the point 20, the second digit to that of the point 21 with respect to plate 39, and the third digit to that of the point 22 with respect to plate 40. If the linkages are scaled so that the maximum individual displacement of the point 21 is half that of the point 20, and the maximum individual displacement of the point 22 is half that of the point 21, then the eight stable positions described above are the usual representations of the total displacement of the point 22 in Simple Binary Code.

Starting in code 000, the position of the point 22 is taken to be zero. Displacement of the point 22 by the equivalent of seven units causes the three bistable linkages to produce the code 111. It will be remembered that the maximum displacement of each bistable linkage is limited by the relevant pair of stops 32, 33 . . . 37.

Intermediate codes will be indeterminate unless the relative strengths of the three springs 29, 30 and 31 are known. For example, if the first spring 29 is sufficiently stronger than either of the other two, then displacement of the point 22 by three units can only give the code 011. If on the other hand the spring 29 is sufficiently weaker than the other two, displacement of the point 22 by three units will result in a code ending in 00. In this case, assuming the scaling of the linkages to be in the ratio of 1:½:¼, the displacement of the point 22 by three units results in the displacement of the point 20 by three units, whereas the minimum displacement needed to move the point 20 is four units. Thus the code ending in 00 for a displacement of three units is inherently unstable, without an external force applied to the largest bistable device.

If however the strengths of the three springs 29, 30 and 31 are different for each linkage, sufficient to prevent a larger linkage from moving appreciably, at any point, during a gradual increase or decrease in displacement of the point 22, until the next smaller linkage is fully displaced in that direction, then the possible code patterns for eight equally spaced displacement positions (hereinafter called "levels") 0 to 7 are as in the following table:

| Level | Pattern | Possible alternative |
|---|---|---|
| 0 | 000 | |
| 1 | 001 | |
| 2 | 010 | or 0, →½, 1 |
| 3 | 011 | |
| 4 | ¼11 | |
| 5 | 101 | or 1, →½, 0 |
| 6 | 110 | or 1, →½, 1 |
| 7 | 111 | |

In this table symbol →½ means that the stated pattern will result if the displacement is very nearly but not quite as large as the nearest integral value. The symbol "¼" in level 4 is intended to show that the largest bistable device extends by only a quarter of its full extent; it is therefore an incorrect code in Simple Binary and is also not an internally stable condition. Levels 2, 5, and 6 also give ambiguities.

Simple analysis shows that if the stops of type 32, 33 are placed near together giving a minimum angle between the linkages smaller than that at the neutral spring position then more than one level may be coded incorrectly, as well as further ambiguities in the patterns. However, a coder error can never occur if the over-all pattern is internally stable, i.e. if it is in a condition of over-all minimum potential energy. Such errors can therefore always be avoided by superimposing on the desired steady state displacement of point 22 a vibration of any waveform provided that its peak amplitudes decay to less than ±½ unit and remain long enough at large enough amplitude to allow all changes in the linkage positions needed for the correct code. (This process is very similar to that of magnetising a piece of iron having appreciable coercivity to a particular magnetised level: this can be done by superimposing an oscillation decaying to nearly zero on the D.C. applied field, the amplitude of the oscillation depending upon the coercivity.)

Now, instead of a random waveform for this superimposed oscillation, an optimal waveform will be described for the purpose in view. For any level "$l$" let the total waveform have constant damping to give displacement $$s=l\left(1+\frac{\sin t}{2^{2}p}\right)$$

where $p$ is the number of periods from the start and $t$ is time. Then the first positive peak amplitude will be $l(1+½)$, the first negative peak will be $l(1-¼)$, the second positive peak will be $l(1+⅛)$, etc., the oscillatory component decaying to half its previous value at each successive half period. The effects of such a waveform on the three linkage systems of FIGURE 2 (with stops of the type 32, 33 as shown) will now be considered. A periodicity slow enough for the inertial forces due to the masses of the linkage elements to be negligible will be assumed.

LEVEL 1

At $p=½$, $s=1+½$. This forces the third linkage system (called R3) to condition "1" and R2 to condition ¼ (R2 has links double the length of R3). R1 stops at "0." At $p=1$, $s=1-¼$; R3 is moved back to condition ¾ while R2 returns to "0."

On further swings R1 and R2 rematn at "0," while R3 approaches asymptotically to "1." If a decision device is added to cause R3 to give an output code of one as soon as it does not thereafter swing to less than half, this decision can thus be made at $p=½$, and the output code is 001 correctly with no ambiguity.

LEVEL 2

At $p=½$, $s=2(1+½)=3$. This forces both R3 and R2 to condition "1" with no remainder to move R1. At $p=1$, $s=2(1-¼)=2-½$, R3 moves back to condition "0," R1 stays at "0" and R2 moves back to condition ¾ (i.e. displacement 1½). At $p=3/2$, $$s=2(1+⅛)=2+¼$$

R1 stays at "0," R2 moves to condition "1," and R3 to condition "¼," after which R3 becomes asymptotic to "0." The output code is thus 010. After $p=½$, R2 stays within its final condition range ("½" to "1"); therefore the decision to code the second digit, now a "1," can be made at $p=½$. The decision to code the third digit, however, from R3, cannot be made till $p=1$, the earliest moment after which R3 thereafter stays within the final condition range ("0" to "½").

Figure 3:
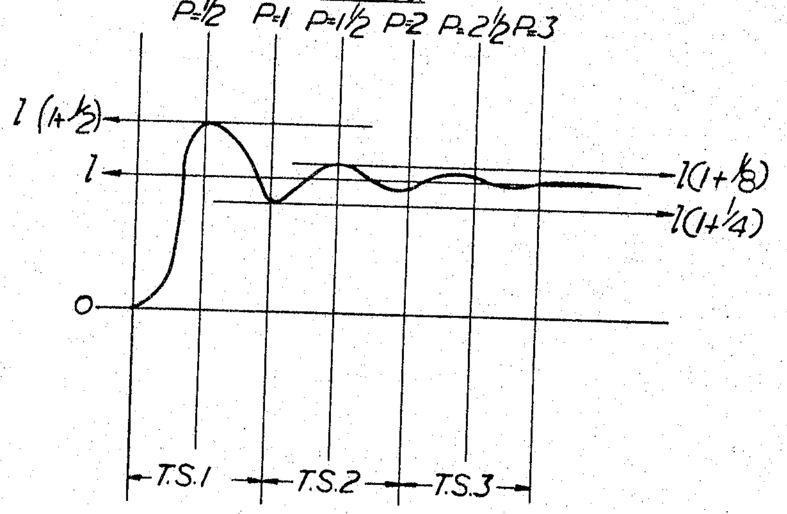
FIG. 3 is a graph depicting a damped oscillation.

With the above assumption similar simple analysis shows that with this type of input waveform any integral level $l$ will be coded correctly and without ambiguity whatever the number of linkage systems (and therefore the number of digits in the code). At the first positive peak $p=½$, $s$ will be $l(1+½)$. Let the largest linkage system to be coded as a "1" be that capable of an internal displacement ("weight") $w_m$ (where $m$ is the linkage system sequence number, starting at $m=1$, for the largest system). To move this system to condition "1" its minimum displacement is $w_m/2$; and to obtain this on the first (positive) peak all smaller systems must first be moved to their condition "1," needing an extra displacement of $w_{m+1}+w_{m+2}+ \ldots +1=2w_{m+1}-1=w_m-1$. Hence the total displacement required of the $m$th system is $w_m(1+½)-1$, which minimum value at $p=½$, $s=l(1+½)$ will always exceed by one unit. Similarly the following half swings are always sufficient to restore the smaller systems to condition "0" if that is what the correct code pattern demands, while causing them to stay at, or end at, condition "1" when the correct coding calls for that configuration—and without ambiguity. Further, with the one theoretical but not practical exception of a level causing a linkage system to end in condition "½" (in equilibrium but unstable), any applied level whether at an integral step or not can be shown to be coded correctly and without ambiguity, the output code corresponding to the nearest integral level that is less than $l+1$. (The error of one unit can easily be corrected by substracting 1 from the applied level at the input.) Also, the same analysis shows that the decision to code the largest linkage moving to condition 1 can always be made at $p=½$, i.e. during "time slot 1" (shown at TS1 in FIGURE 3). For most if not all practical points of view the superimposed simple damped train of FIGURE 3 is therefore an optimal waveform for the needed oscillatory component; it not only always codes correctly but it does so in minimum time.

Now consider the case where the inertial forces can *not* be neglected.

LEVEL 4

Take level 4 at $p=\frac{1}{2}$. Then $s=6-1=5$. Linkages R2 and R3 are first forced to move to condition "1," at approximately the same speed as the input waveform, if the latter has sufficient power not to be affected appreciably by the load due to the linkages. When $s$ has increased to 3, R1 is then forced (again at approximately the speed of the input wave) from zero displacement to displacement of 2 units (condition "½"), its static dead centre. But having been accelerated at the speed of the input wave during the interval when $s$ is increasing from 3 to 5, its momentum, together with the positive feedback due to its spring when once its dead centre is passed, will carry it to condition "1" at least by time $p$, that of the first negative peak, the short time region when the decision as to the final condition of the linkage system has to be made. At this time $p$, then, the second linkage system codes a "0," followed immediately by a "0" code from the third linkage system just as in the previous cases where the inertial forces were neglected.

LEVEL 3

At $p/2$, $s=4\frac{1}{2}-1=3\frac{1}{2}$. Hence the first linkage system is forced at approximately the speed of the input waveform to displace from 0 to ½ units (condition "0" to condition "⅛"). If the momentum collected during this short-lived displacement is enough to make the displacement continue sufficiently past the dead centre to end in condition "1," taking into account the combined forces remaining on the system during the process including the assumed fluid damping on this system, then the output code will be 100 instead of the usual result 011 from level 3. But this would need abnormal parameters; experiments on a simple analogue computer have shown that normal values need an input level nearer to 3.5 than to 3.0 to give code 100 in this case. Consider now, qualitatively, the effects of varying the moment of inertia of the first linkage system, assuming a constant reverse force for a given velocity due to the fluid damping. Take a critical level about half way between quantum steps, where at $p/2$ the linkage is at about the dead centre. The greater the inertia of the linkage the slower will the system be moving from near its dead centre either to condition "1" or back to condition "0," by the force from its spring alone. But other things being equal the greater the inertia of the linkage the greater will be the kinetic energy collected by the system during its short acceleration period, the less will it be slowed down by its spring after the acceleration ceases at $p/2$ till the dead centre is reached, and therefore the greater its velocity in passing through that region. It is thus clear that on increasing the inertia of the linkage system two opposing trends arise that tend to balance out, the overall result being that the coding time for the first digit is fairly independent of the inertia of the system. The same arguments can be applied to all the other linkage systems in an arrangement such as that of FIGURE 2.

Now consider the effect of a critical level region, nearly half way between quantum steps 3 and 4, on the combined actions of R1 and R2. When inertia is neglected, except for very occasional very highly critical levels, R1 is approximately either in condition "0" or condition "1" at time $p/2$. But with inertia in R1 this system may be in its dead centre region at $p/2$. This, with the inertia of the linkage, will force R2 more quickly into its condition "0" during the first negative swing from $p/2$ to $p$, which in turn will accelerate R1 further towards its condition "1" and thus increase the tendency for a code 100 to be given. If however the input level, combined with the opposing forces during this negative swing, is insufficient to bring R1 near enough to its dead centre at $p$, the next positive swing from $p$ to $3p/2$ will cause R2 to take up condition "1" quite quickly, which in turn will react on R1 and increase its acceleration back to its condition "0." The inertia of R1 thus brings into play a positive feedback action having the effect of speeding up the coding times of both R1 and R2, thus largely balancing out any increase in coding times due to the inertia. Experiments on an analogue computer have confirmed the above qualitative arguments.

By using the equilibrium coder principle described above a coder is provided having at most the same number of coding elements as in a normal serial coder ($\log_2 n$ if there are $n$ levels), compared with the $n$ such elements in a parallel coder, while at the same time having a faster coding speed for given component time constants. This advantage arises from the fact that in the normal serial coder the bistable or other coding elements have to move in strict sequence, each one settling down to within about half a quantum step before the next can actually start operating. In the equilibrium coder, however, a large part of these movements can occur simultaneously, each in general having never to move more than about half way before the next can start. The level quantising, too, takes place in the coder itself; no external discriminator is needed as is sometimes the practice with conventional serial coders.

Furthermore, an increase in tolerance for given accuracy on the coding element "weights" can be obtained (i.e. their internal displacement from their positions "0" to their positions "1"). Without any safety factor, in a normal serial coder having $n$ levels a serious coding error may occur if the tolerance on the largest element weight is more than about $\pm\frac{1}{2}{}_n$; an increase in level of one step may then give a code representing a level increase of two steps resulting in undue distortion. But it can be shown that by suitable adjustment a weighting error in any one digit of an equilibrium coder is partly divided and shared with other digits, thus smoothing out what would otherwise be a sharp kink in the linearity of the coding curve, and therefore in many applications appreciably reducing the bad effects of that weighting error. In practice in a serial or equilibrium coder the practically obtainable tolerance on the element weight is often a limiting factor in the design.

*Electronic embodiments of the equilibrium coder principle*

Figure 5:
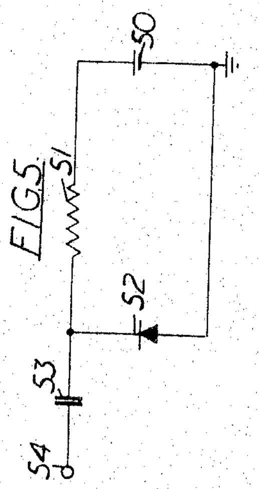
FIG. 5 is a bistable electronic circuit using a tunnel diode.
Figure 4:
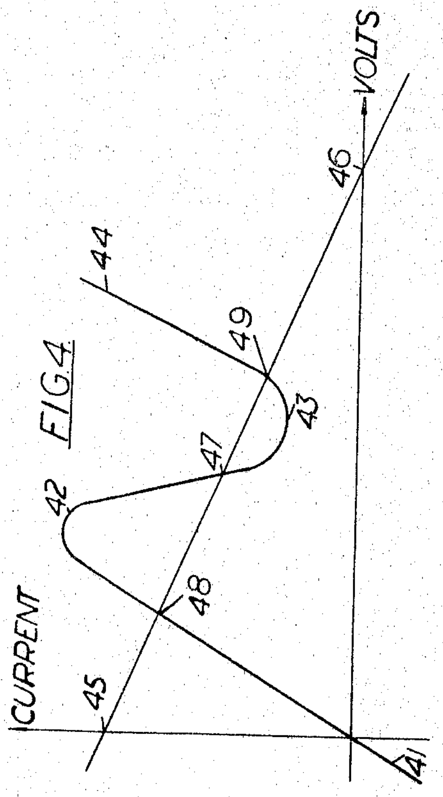
FIG. 4 is a graph depicting the voltage/current characteristic of a tunnel diode.

The basis of each digit element is simply a bistable element. As a simple example a tunnel diode embodiment containing 4 digit elements, and therefore capable of coding 16 levels on a Simple Binary basis, is described. It should be noted that an equilibrium coder uses basically a two-electrode component of this kind for its coding elements; in many serial coders a third control electrode decoupled from its output is needed, thus prohibiting the large range of purely two-electrode devices that could otherwise be used. The basic circuit for such bistability from a single tunnel diode is well known; it is shown in FIGURE 5, the diode static characteristic being as shown by the line 41, 42, 43, 44, of FIG. 4. There is a battery 50 in series with resistor 51 and the tunnel diode 52 as shown in FIG. 5, thus giving the load line 45, 46. The circuit has an unstable equilibrium point 47, and two stable equilibrium points 48 and 49, FIG. 4. If initially the circuit is in equilibrium position 48, a suitable extra voltage at point 52, e.g. via capacitor 53 from point 54 triggers the circuit to its second equilibrium position 49, at which it remains until restored to position 48 by external means, e.g. by a negative voltage applied at 54.

Figure 6:
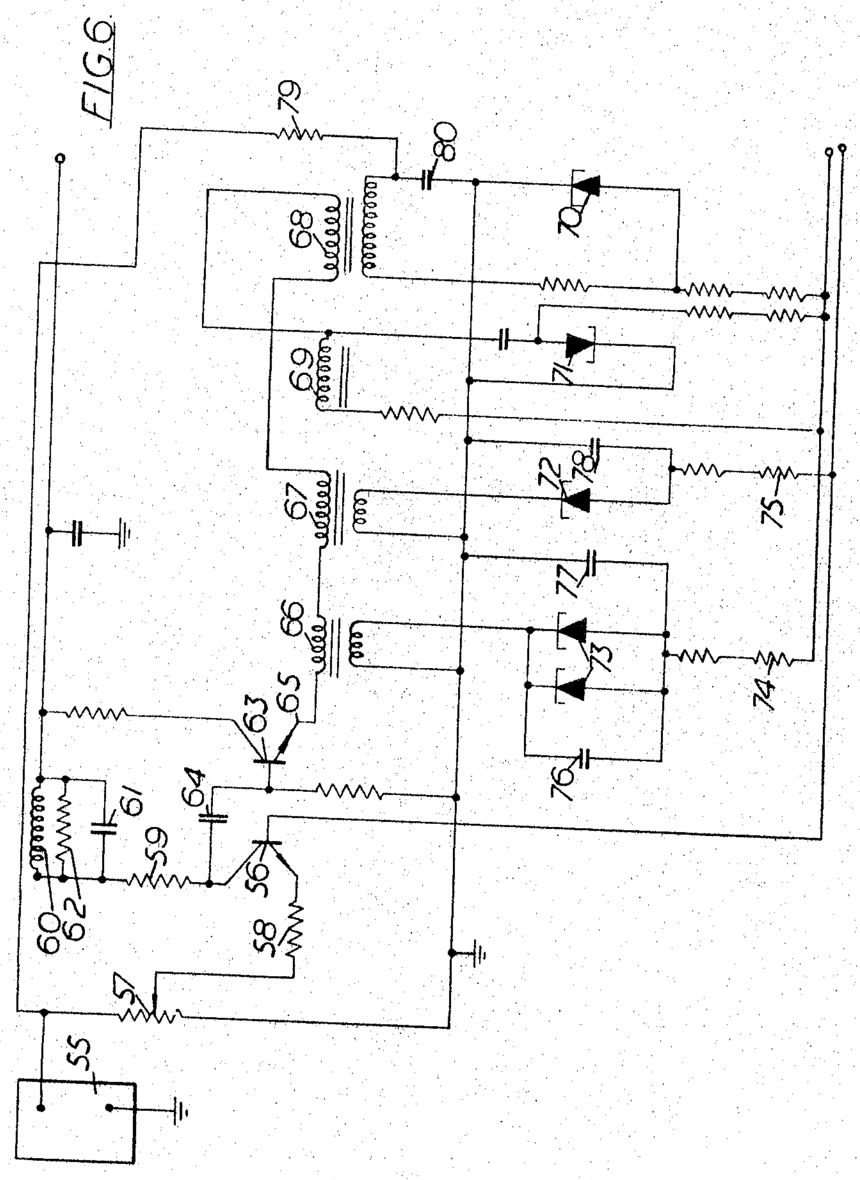
FIG. 6 is a circuit diagram of a 4-digit coder.

The coder circuit of FIG. 6 uses a 2 mc. oscillatory input waveform component (to give a coding time suitable for a 24-channel PCM speech system of 128 companded levels). As the tunnel diodes used may be capable of much higher switching speeds than 2 mc. this circuit is therefore more typical of the example considered above, where the inertial forces can be neglected, than the example where these inertial forces are important.

In FIGURE 6, the analogue signal sample source 55 is connected to the input of a common-base transistor amplifier 56 via a gain control potentiometer 57 and a resistor 58. The collector circuit of 56 is completed as shown via a resistor 59, and a tuned circuit 60, 61 damped by resistor 62, the values of these components being adjusted to give at the collector a voltage waveform corresponding to that of FIGURE 3. The collector of 56 is connected to the input of an emitter follower stage 63 by a capacitor 64, giving a low impedance source at the output point 65. The emitter circuit of 63 is completed via primaries of transformers 66, 67 and 68 and a choke 69. Transformer 66 has a step down voltage ratio of 4:1, transformer 67 a step down ratio of 2:1; transformer 68 a step up ratio of 1:2 and the voltage ratio at the choke 69 is unity. The tunnel diodes 70, 71, 72 and 73 are connected to the transformer secondaries and the choke 69 as shown. The current difference between the peak and the valley values of the static characteristic of tunnel diode 70 is 1 milliamp, that of diode 71 is 4 milliamps, of diode 72 is 16 milliamps, and of diode 73 it is 64 milliamps. Diode 73 is shown as being a pair of diodes in parallel, each requiring 32 milliamps; they could of course be replaced by a single diode of 64 milliamps. Resistors 74, 75, etc. are to obtain the correct biases at the tunnel diodes. The capacitor 76 shown across the "largest" tunnel diode 73 (the pair) is to prevent spurious oscillations. Because of the shape of their characteristics, when using tunnel diodes it is necessary to code voltage not currents; this could of course be done by using for the smallest element a diode having one unit of voltage between the two stable equilibrium positions, two units for the next largest digit, four for the next and so on. With tunnel diodes of given materials, however, the voltage difference between the positive peak and the negative trough on the static characteristic is substantially a constant quantity; therefore the transformer arrangement of FIGURE 6 is used to give the same effective result, while using tunnel diodes of constant voltage difference between the equilibrium points.

The operation of the four tunnel diode units coupled together as shown is completely analogous to that of the system of linked arms shown in FIGURE 2, the largest of these tunnel diode units corresponding to the largest linkage system and the smallest unit to the smallest linkage system.

It will be noticed that the tunnel diodes' D.C. return loops are completed only via relatively high resistors 74, 75, etc. used for the bias supplies, which are shunted by capacitors 77, 78. The purpose of this arrangement is to obtain a small amount of D.C. self-biasing on these diodes, which acts in the forward direction, a previous pulse encouraging not discouraging the firing due to the next pulse, thus largely balancing out the backlash in the opposite direction due to the finite bandwidth of the transformers. Tunnel diodes will in fact operate satisfactorily as bistable elements without any D.C. return loops, if a suitable capacitor is used.

The receipt of the sample pulse from the source 55 excites the damped tuned circuit 60, 61 and 62, which produces a waveform such as that shown in FIG. 3. This waveform, the first peak of which has positive peak amplitude equivalent to $l(1+\frac{1}{2})$, is applied by way of the emitter follower stage 63 and the couplings 66, 67, 68 and 69 to the diodes 70, 71, 72 and 73. The circuit parameters are such that this positive peak amplitude will be sufficient, taking into account the coupling ratios of couplings 66–69, to switch the diode corresponding to the largest "1" digit to the "1" condition, and also all the lower order diodes. On the succeeding negative half cycle of amplitude $l(1-\frac{1}{4})$ those diodes which are now in the "1" condition and yet have a sufficiently low switching requirement to be affected by the negative half-cycle will be reset to the "0" condition. Each succeeding half-cycle will switch those diodes whose switching requirements are less than the amplitude of the relevant half-cycle, whilst leaving those diodes whose requirement is larger in the condition they were in previous to that half-cycle. Thus as the damped oscillation disappears the diodes will be left in the "0" or "1" conditions according to the initial amplitude of the input waveform and the resulting rate of decay of the oscillation content thereof. The conditions of these diodes are read out as the code combination for the analogue level coded.

At the end of the input from the source 55 all tunnel diodes return to their equilibrium positions "0." The bandwidths of the transformers are such as to pass substantially all the important components of the waveform shown in FIGURE 3. The resistor 79 (connected directly to source 55) and the capacitor 80, are included to give additional compensation for the finite bandwidths of the transformers, a correction that is most needed at diode element 70.

*A digital companding coder*

Figure 7:
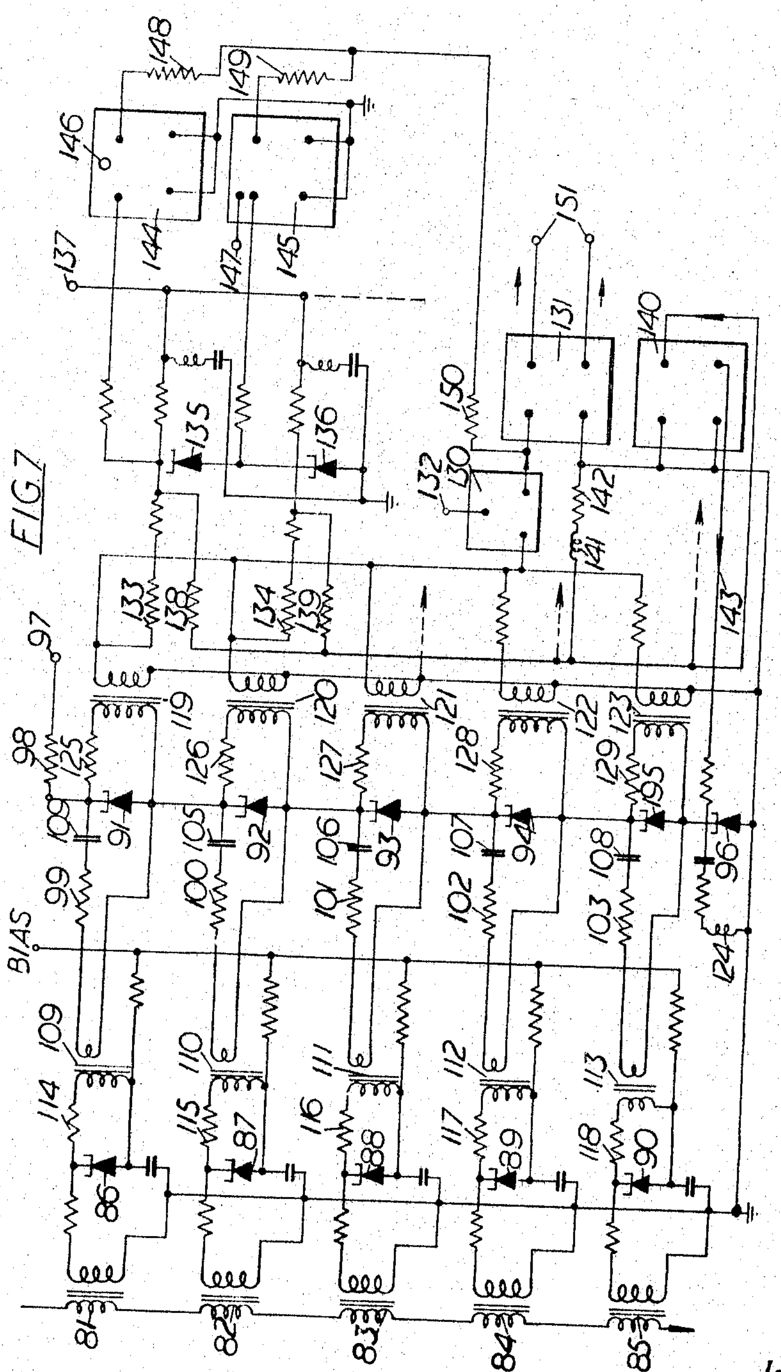
FIG. 7 is a circuit diagram of a digital companding coder.

In FIGURE 7 the transformers 81 to 85 and the tunnel diodes 86 to 90 represent the last part of the circuit of FIGURE 6, the only difference being that in the present case there is added a further fifth coding element. The tunnel diodes 86, 87, 88, 89 and 90 have current differences between peak and valley levels of 256, 64, 16, 4 and 1 ma. respectively. The unit 84 is shown as a transformer though it could be a choke, as in FIGURE 6. Transformer 81 has a step down ratio of 8:1, transformer 82 a step down of 4:1, 83 a step down of 2:1, 84 a ratio of unity and 85 a step up of 1:2. The part so far described therefore gives a linear equilibrum coder of 32 levels, providing a 5-digit output code. For the purpose of digital companding the last two digits will represent the position of the most significant digit of the 5-digit code and the first three digits the next three most significant digits in the 5-digit code.

The equal-current tunnel diodes 91 to 95, and 96 are placed in direct series connection as shown, completing the circuit from point 97 to ground via resistor 98. Point 97 has a direct voltage applied to it sufficient in the presence of the common resistor 98 to maintain one only of the tunnel diodes 91 to 95 in a "1" condition, all the others being in a "0" condition. Superimposed on the direct voltage at point 97 is the pulse waveform shown in FIGURE 8(*a*), obtained by any conventional means. The peaks of this pulse waveform are sufficient for one, but only one of the tunnel diodes 91–96 to trigger simultaneously from condition "0" to condition "1." Tunnel diodes 91 to 95 are connected as shown by decoupling resistors 99 to 103, and capacitors 104 to 108 to the secondary windings of transformers 109 to 113, the primary windings of which are connected to the tunnel diodes 86 to 90 via decoupling resistors 114 to 118.

When tunnel diode 86 changes to the "1" condition a small positive voltage is applied to the anode of tunnel diode 91. Similarly a triggering of tunnel diode 87 produces a positive voltage on the anode of tunnel diode 92, etc. The sixth tunnel diode, 96, in the second chain is not connected to any diode in the first chain. Due to the shunt impedances across each of the diodes 91 to 96, including the leakage inductance of transformers 109 to 113 and 119 to 123, each of these diodes acts as an astable (i.e. self-restoring) circuit, the restoring time being slightly lower than the duration of the input sample waveform from the source 55 in FIGURE 6.

The characteristics of transformers 109 to 113, in combination with the total impedances shunted across each, are such that the positive voltage supplies from transformer 109 to tunnel diode 91, or from transformer 110 to tunnel diode 92, etc. fall by only a small amount until at least the time $2p$ (see FIGURE 3) has been reached. Inductor 124 is added in the circuit of diode 96 of such a value that the restoring time of the astable circuit formed by diode 96 is the same as that of the other diodes in that series.

The restoring times of all the astable circuits in the series 91–96 are equal to $p/2$, but by suitable choice of component values the "re-firing" times are such that when any one of them has triggered at time $3p/2$ it cannot trigger again after being restored until the end of the input sample wave given by the source 55 of FIGURE 6. All the tunnel diodes of the chain 91 to 96 have exactly the same characteristics and have no separate biases applied in shunt. Hence when the peaks of the pulse waveform of FIG. 8($a$) arrive the choice as to which diode is triggered is of course random. But if separate voltages are applied in shunt to assist the triggering, the diode that receives the largest such voltage will start triggering first, and in doing so will inhibit the others. While a diode of the series 86 to 90 is still swinging backwards and forwards past its dead centre during the input damped oscillation, with the exception under some circumstances of the largest diode thus swinging, it will be in the region of condition "0" at times $p$, $2p$, $3p$, etc.; but it will be in the region of condition "1" at these complete periods, if it finally settles down in condition "1", at and after the time at which this settling down occurs. This settling time for each of the diodes 86 to 90, at the appropriate full period $p$, $2p$, $3p$, etc., is the earliest moment at which a diode can be sampled to determine its final condition, i.e. it is the "decision time" for that diode.

Figure 8:
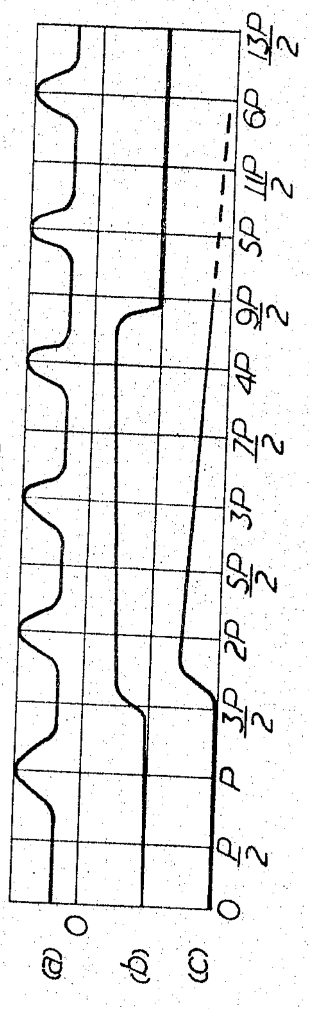
FIG. 8 illustrates certain of the waveforms used in the circuit of FIG. 7.

If the frequency of the input waveform is low enough to make negligible the inertial forces at the diodes, due to their internal and external inductances combined with any delayed action that the carriers at their junctions may have, the diode of the series 86 to 90 producing the largest code digit ending in condition "1" will always settle at or a little before time $p$; and the decision times for other diodes giving "1"—condition digits will never exceed $p(1+u/2)$ where it gives the $u$th digit from the code group start. Hence in the present instance where the 4 most significant code digits are required (and 3 digits are needed to transmit the last three of this group of 4), the latest decision time for any coding diode is $3p$. If on the other hand the inertial forces on the diodes cannot be neglected at the waveform and frequency used, the latest decision time, with a practical maximum for such an inertial force, for the largest-digit diode would be $2p$, and for the remainder $p(2+u/2)$, which in this example would give $4p$ for the latest decision time for any coding diode. In FIG. 8 the smaller inertial force has been assumed, and applies to a normal tunnel diode switching at 2 mc.

The first positive peak of the waveform of FIG. 8($a$), applied at terminal 97, thus always triggers that diode of the chain 91 to 95 that is connected to the largest diode of chain 86 to 90 which has settled in condition "1". If the next code digit is a "1" the next smaller diode in chain 86 to 90 will have moved to its condition "1" by time $2p$ when the second peak of the wave for FIG. 8($a$) arrives.

Diodes 91 to 95 are connected via decoupling resistors 125 to 129, transformers 119 to 123, and gate 130 to a pulse amplifier 131, for instance a conventional transistor amplifier. Gate 130 conducts only on arrival of the waveform of FIG. 8($b$) at terminal 132, this waveform being obtained by known means, and so rejects the first code digit (always a 1, and therefore not needing to be sent) but passes the second three, which give the 2nd, 3rd and 4th most significant digits, at times $2p$, $3p$ and $4p$. This amplifier 131 may also be "regenerative" if required (i.e. it may reshape its input pulse waveform in amplitude and timing).

Transformers 119 to 123 are also connected via decoupling resistors 133, 134, etc. to tunnel diodes 135, 136, etc., each of the latter being an astable, with a restoring time occurring later than the trailing edge of the input pulse of FIG. 3 (or in practice the PCM sampling pulse). By impressing on terminal 137 a suitable pulse at time $p$, by conventional means, one of the diodes 135, 136, etc. is caused to trigger according to which of them is connected to the diode in series 91 to 95 that triggers first, at time $p$.

Diodes 135, 136, etc. are connected via decoupling resistors 138, 139, etc. to the input of an amplifier 140, which can be of a one-stage transistor type of high input impedance. By a suitable inductor 141 and resistor 142 (or other simple equivalent means) the waveform at the input and output of 140 is given the shape of FIG. 8($c$), decaying exponentially, and the resistors 138, 139, etc. are of such values that its initial voltage is 1 unit from diode 135, 2 db less than 1 unit from diode 136, 4 db less than 1 unit from the next diode, etc.

The output of 140 is impressed via point 143 on the diode 96 (unconnected to the series 86 to 90) so that if diode 135 has triggered at time $p$ sufficient aiding voltage is supplied to diode 96 to enable it to trigger at times $2p$, $3p$, etc., rather than any of the diodes 92 to 95, except when at these times there is an aiding voltage on any of the latter from the corresponding diode in the series 87 to 90. The effect of this circuit is therefore to make the diodes in the series 91 to 95 always trigger in the correct order, whether the digit code at the period $p$, $2p$, etc. is a "0" or a "1".

All tunnel diodes in the series 135, 136, etc. except the smallest three (i.e. 135 and 136 in the present example of FIG. 7) are used also to obtain and transmit the last two digits of the output code, in the present case consisting of —00, —01, or —10, indicating the position and value of the most significant digit, where the first three digits give the next 3 most significant digits. Each diode 135, 136, etc. is connected as shown to one or more gates 144, 145, etc., one capable of being opened only at time $q1$, another at $q2$, a third at time $q3$, etc., up to $q_n$, where there are $m$ possible positions for the most significant digit, $n$ is the number of digits to transmit this number $m$ in Simple Binary Code, and $q1$, $q2$, $q3$, etc. are the desired times of transmission for the code digits. In the present case $m$ is 3, so $n$ is 2. The correct gate opening times are given by impressing square pulses at these times, obtained by simple conventional means, on terminals 146, 147, etc. If $m$ is greater than three, some of the diodes 135, 136, etc. will be connected to more than one gate of type 144; for example, that diode in series 135, 136, etc. indicating when triggered position "5" for the most significant digit will be connected both to a gate of type 144 or 145 opening at time $q_{m-2}$, and to another opening at time $q_m$, in the conventional way in which the outputs from the separate elements of a parallel binary coder are coded and serialised. The outputs from the gates 144, 145, etc. are connected in parallel, via suitable decoupling resistors, 148, 149, etc. and the common resistor 150 to the input of amplifier 131, that transmits the remainder of the output code. In this manner the complete code group representing both the most significant digit and the next three most significant digits is transmitted to the line circuit via the terminals 151.

Certain codes other than Simple Binary can also be given by coders on the "equilibrium" principle by suitable simple modifications. For example, a "reversed pulse" code is a type of ternary that a Simple Binary equilibrium coder can be caused to give merely by the addition of one binary divider stage at its output. Another ternary code, useful in practice where the line attenuation increases with frequency, is the Simple Ternary, which by known simple means can be changed at its output to a form of Balanced Binary code that under these circumstances is almost always more efficient than Simple Binary, and in some practical cases more efficient also than a "reversed pulse" type of ternary.

If each coding element, e.g. the linkage systems of FIG. 2 or the tunnel diodes in the series 86 to 90 of FIG. 7, have three stable conditions instead of two, described for example as "condition '0' ", "condition '1' ", and "condition '2'," the weighting ratio between successive coding elements is 3 instead of 2, then Simple Ternary Code is given by such an equilibrium coder. In practice it is usually inconvenient for the coding elements to have more than two stable conditions; in such cases, e.g. when using tunnel diodes as already described, each coding-element tunnel diode (or other bistable device) is replaced by a pair of equal such elements, the total element weight at each of the four permutations of stable conditions being taken as the sum of the separate two weights. Thus there are four possible total element weights, 0+0, 0+1, 1+0, and 1+1. But the second permutation gives the same total weight as the third; there is a redundancy of one permutation. Thus there are only three different weights, 0, 1 and 2. It can be shown from qualitative analysis that in the action of such a ternary equilibrium coder where each element consists of a pair of equal elements, the arrival from a level "1" of the permutation "0," "1" is equiprobable to that of the permutation "1," "0"; the decision is random. But this random factor has no influence on the final results, as it is only the sum of the two code digits in each pair that has any influence on the output code given.

What I claim is:

1. An analogue-to-digital converter, which comprises a system of inter-coupled multi-stable devices each of which is imparted a different switching characteristic, and to which an analogue quantity to be converted to its digital equivalent can be applied, the application of said analogue quantity tending to set said multi-stable devices to any one of a number of conditions, and an input over which a damped oscillatory condition may be applied to said multi-stable devices, the arrangement being such that when said oscillatory condition ends the conditions to which said multi-stable devices have been set as a result of an analogue condition applied thereto at the same time as said oscillatory condition represent a digital code combination corresponding to said analogue condition.

2. A converter as claimed in claim 1, in which each said multi-stable device is a bistable device, successive bistable devices being responsive to conditions varying in a binary manner, and in which said damped oscillatory condition includes a number of half-cycles at least equal to the number of said bistable devices, each said bistable device assuming its final setting during a different one of said half cycles.

3. An analogue-to-digital information converter in which an analogue input is quantized into one of $k$ levels each of which is represented by a code combination in an $n$-digit code, the converter including a system of inter-coupled permanently or temporarily multistable devices on which the analogue input is impressed, the system of multistable devices being such that for an input level applied unvaryingly with time there is a range of permutations among the multistable devices giving $n$-digit output code combinations representing $k$ levels, but representing only one level, that of the input, after the superposition on the intercoupled system of a damped oscillation.

4. An analogue-to-digital converter, including means for generating a waveform which is a combination of a step function of the analogue input level and a superposed damped oscillation, a system of $n$ intercoupled permanently or temporarily multi-stable devices each of which is normally in a first stable condition, the devices each being biassed so as to change from the first stable condition to another stable condition in response to the first half cycle of an oscillatory waveform when the latter exceeds a predetermined value and to change from an existing stable condition to another stable condition on succeeding half-cycles depending on whether or not the waveform amplitude exceeds the predetermined amplitude, said predetermined amplitude being different for all the multi-stable devices, means for applying the generated waveform to all of the multi-stable devices together so that at the termination of the superposed damped oscillation the combination of multi-stable devices remain in one or other of their stable conditions, which combination can be read out as the $n$-digit code combination for the quantized analogue input.

5. An electrical P.C.M. coder in which a signal sample to be coded into an $n$-digit form is applied to an oscillatory circuit to cause the latter to generate a waveform which is a combination of a step function of the analogue input level and a superposed damped oscillation, the coder having a system of $n$ bistable devices each of which is normally in a first stable condition (hereinafter called the "0" condition), which bistable devices are each so biased as to change from the "0" condition to a second stable condition (hereinafter called the "1" condition) in response to an input waveform of predetermined amplitude, said amplitude being different for all of the $n$ bistable devices, a connecting circuit by which said generated waveform is applied to all of said bistable devices together so that the first half-cycle thereof sets a combination of the bistable devices, dependent on its amplitude, to their "1" conditions and the next half-cycle resets a combination of the devices, dependent on its amplitude, to their "0" conditions, and successive half-cycles cause successive settings and re-settings of combinations of the devices to their "1" and "0" conditions until at the termination of the superposed oscillation a combination of bistable devices remain in the "1" condition which combination can be read out as the $n$-digit code for the signal sample.

6. A coder according to claim 5, in which each bistable device includes a tunnel diode in series with a resistor and a source of potential.

7. A coder according to claim 6 in which each bistable device is coupled to the output of the oscillatory circuit by a transformer.

8. A coder according to claim 7, in which the voltage ratio of the transformer associated with one bistable device is twice that of the transformer having the next largest ratio.

9. A coder according to claim 8, in which the amplitude of the current required to change one bistable device from "0" to "1" is four times that of the next largest current amplitude required.

10. A coder according to claim 9 in which the bistable device requiring the largest changeover current is associated with the transformer having the lowest step-up ratio.

11. A coder according to claim 10, in which each tunnel diode is provided with a small amount of D.C. self-biasing in the forward direction.

12. A coder according to claim 11, in which the generated waveform for any analogue input level $l$ has a displacement $$s=l\left(1+\frac{\sin \omega t}{2^2 p}\right)$$

where $p$ is the number of periods from the start and $t$ is time.

13. A coder according to claim 12, in which the combination of bistable devices remaining in the "1" condition at the termination of the superposed damped oscillation can be read out as an $n$-digit binary code combination for the signal sample level.

14. A coder according to claim 13, including a second system of $n$ bistable devices each of which is normally in the "0" condition and coupled to one of the $n$ bistable devices of the first system, means for applying a bias potential to the second system of bistable devices, means for applying a pulsed waveform, at periods $p$ from the start of the generated waveform, to the second system of bistable devices so that at each period $p$ only one of said bistable devices will change to the "1" condition under the combined influence of the bias potential, the pulsed waveform and the "1" condition output from the corresponding bistable device of the first system, the bistable devices of the second system changing to the "1" condition in the order of significance of the $n$ bistable devices of the first system, and means for deriving an output pulse on a common connection from the $n$ bistable devices of the second system each time one of them changes to the "1" condition.

15. A coder according to claim 13, including a third system of $n$ bistable devices each of which is coupled to a corresponding one of the $n$ bistable devices of the second system, means for applying a pulsed waveform of frequency $1/p$ to the third system of bistable devices so that the devices coupled to the bistable device of the second system which changes to the "1" condition will provide an output, means for deriving from said output a damped waveform which is impressed on the second system of bistable devices so that the bistable devices in said second system always change to the "1" condition in the correct order of significance.

16. A coder according to claim 15 including means for selecting the $m$ most significant output pulses derived from the second system of $n$ bistable devices, and means for generating an additional digit code combination according to the significance of the most significant of the $m$ output pulses.

17. A coder according to claim 16 including means for rejecting the most significant of the $m$ output pulses.

18. A coder according to claim 17 in which the means for generating the additional digit code combination includes means for deriving output pulses from the $n-m$ bistable devices of the third system having the greatest significance, and means for selecting a combination of said output pulses at predetermined intervals to form said additional digit code combination.

No references cited.

MAYNARD R. WILBUR, *Primary Examiner.*

ALAN L. NEWMAN, *Assistant Examiner.*